(No Model.)
S. L. WEST.
FILTER.
No. 488,621.
Patented Dec. 27, 1892.
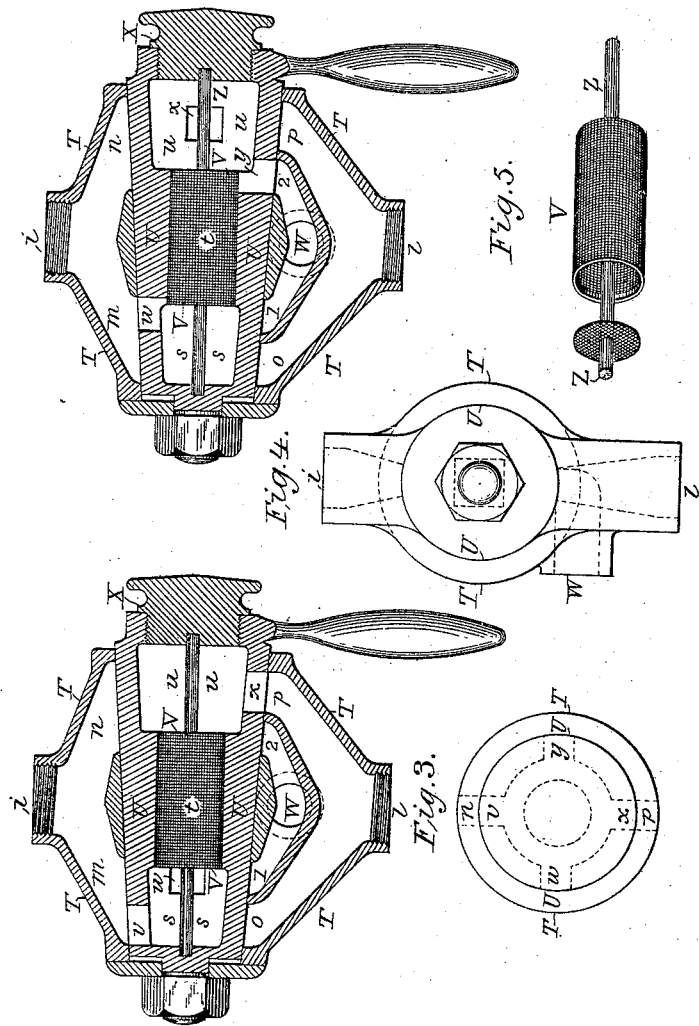
Witnesses
Joseph S. Latimer
Carleton E. Snell
Inventor
Simeon L. West
By his Attorney

UNITED STATES PATENT OFFICE.

SIMEON LESLIE WEST, OF WASHINGTON, DISTRICT OF COLUMBIA.

FILTER.

SPECIFICATION forming part of Letters Patent No. 488,621, dated December 27, 1892.

Original application filed May 14, 1891, Serial No. 392,729. Divided and this application filed March 19, 1892. Serial No. 425,560.

(No model.)

*To all whom it may concern:*

Be it known that I, SIMEON LESLIE WEST, of the city of Washington, in the District of Columbia, have invented certain new and useful Improvements in Filters, of which the following is a specification.

This application is a division of an application for Letters-Patent of the United States filed by me May 14, 1891, Serial No. 392,729, for apparatus for purifying, sterilizing and filtering drinking water. Patent No. 471,261, dated March 22, 1892, has since been granted upon said application.

The object of this invention is to produce a filter, primarily intended for filtering water, but applicable for filtering other liquids, in which the current of water may be reversed through the filtering medium, whereby the filtering material may be cleaned without removing it from the filter, and in which the filtering material may be removed and replaced without cutting off the water supply. The reversal of the current of the water through the filter may also be effected for the purpose of facilitating the passage of the water through the filtering material in case the filtering medium should become compacted by the continual passage of the water in one direction, and without bringing into play the cleansing functions of the filter. The cleaning discharge outlet from the filter is independent of the filtered water outlet, so that the filter can be placed anywhere in a pipe and only filtered water can pass through the piping leading from the filter.

The improved filter is illustrated in the accompanying drawings, wherein

Figure 1, is a central section through the filter. Fig. 2, is a similar section showing the parts in a different position. Fig. 3, is a diagram of the water ports. Fig. 4, is an end view of the filter. Fig. 5, is a detail view of the cage for holding the filtering material.

The filter comprises a casing T, and a conical hollow turning plug U. The casing T, has an inlet opening $i$, and outlet opening $l$, by means of which the interior of the casing communicates with suitable water pipes. The inlet opening $i$, communicates with two branching passages $m$, and $n$, and likewise the outlet opening $l$ communicates with two branching passages $o$ and $p$. These passages cooperate with suitable ports in the turning plug. The hollow interior of the plug is divided into three compartments $s, t$ and $u$, the central compartment $t$ being adapted to contain a filtering medium, such as charcoal. The plug has four ports $v, w, x$ and $y$, two of which, $v, w$, are located in the wall of the compartment $s$, and the other two, $x, y$, are located in the wall of the compartment $u$. These several ports $v, w, x$ and $y$ are located at intervals of ninety degrees, as shown in Fig. 3. As shown in Fig. 1, the plug U is in such position that the port $v$ registers with the inlet branch passage $m$, the port $x$ registers with the outlet branch passage $p$, and the two ports $w\ y$ are idle. The water consequently enters the compartment $s$, thence passes through the filtering medium $t$, and thence out through the compartment $u$. By turning the plug through one hundred and eighty degrees, the current of the water through the filtering medium would be reversed, since the port $y$ would then register with the inlet branch passage $n$, while the port $v$ would register with the outlet branch passage $o$, the ports $w$ and $y$ being idle. The object of the ports $w$ and $y$ is to clean the filter. These ports $w$ and $y$ are adapted to register with the inlet branch passages $m$ and $n$ respectively, but they do not register with the outlet branch passages $o$ and $p$, but with branch passages 1, and 2, of a cleaning outlet W.

In Fig. 2, the plug U, is shown turned to a position at ninety degrees from the position shown in Fig. 1. In this position the ports $v$ and $x$ are both idle, while the port W, registers with the inlet branch passage $m$, and the port $y$ registers with the cleaning outlet branch passage 2. Consequently the water enters the chamber $s$, passes through the filtering medium, and thence out through the chamber $u$. Should the plug be turned one hundred and eighty degrees from the position shown in Fig. 2, the current of the water will pass through the filtering medium in the opposite direction, since the port $y$ would register with the inlet branch passage $n$, and the port $w$ with cleaning branch passage 1, while the ports $v$ and $x$ would be idle.

If necessary to remove and replace the filtering medium, the plug would be turned forty-five degrees from the position shown in either Fig. 1, or 2. In this position all of the ports in the plug would be closed, so that the flow of water would cease. The plug is provided with a removable threaded cap X, so that the inner compartments of the plug can be reached. The charcoal, or other filtering material is preferably inclosed in a cage V, supported by a spindle Z.

I claim as my invention:—

1. The casing T, having inlet $i$ and branching passages $m$ and $n$ leading therefrom, outlet $l$ and branching passages $o$ and $p$ leading thereto, and cleansing outlet W, and branching passages 1, 2, leading thereto, said branches $o$, $p$, 1, and 2, being diametrically opposite to said branches $m$ and $n$, in combination with the hollow turning-plug U, having at its central part a filtering medium and chambers $s$ and $u$ at opposite sides of said filtering medium, said plug having communication with chamber $s$, port $v$ adapted to register with branches $m$ and $o$ and port $w$ adapted to register with branches $m$ and $l$, and said plug having communication with chamber $u$, port $x$ adapted to register with branches $n$ and $p$ and port $y$ adapted to register with branches $n$ and 2, said ports $w$ and $v$ being ninety degrees apart, said ports $x$ $y$ being ninety degrees apart, and said ports $v$ $x$ and said ports $w$ $y$ being one-hundred and eighty degrees apart, substantially as set forth.

2. The casing T, in combination with the hollow turning plug U having a removable cap X, a spindle Z fitting at opposite ends in said cap and in the end of said plug opposite to said cap, and a cage V, surrounding said spindle for holding a filtering material, substantially as set forth.

In witness whereof I have hereunto signed my name in the presence of two subscribing witnesses.

SIMEON LESLIE WEST.

Witnesses:
ARTHUR S. BROWNE,
JOS. H. BLACKWOOD.

Corrections in Letters Patent No. 488,621.

It is hereby certified that in Letters Patent No. 488,621 granted December 27, 1892, upon the application of Simeon Leslie West, of Washington, District of Columbia, for an improvement in "Filters," errors appear in the printed specification requiring correction, as follows: In line 22, page 2, the word "communication" should read *communicating;* in line 25, same page, the reference letter "l" should be *1;* and in line 26, same page, the word "communication" should read *communicating;* and that said Letters Patent should be read with these corrections therein that the same may conform to the record of the case in the Patent Office.

Signed, countersigned, and sealed this 3d day of January, A. D. 1893.

[SEAL.]
                                        CYRUS BUSSEY,
                                   *Assistant Secretary of the Interior.*

Countersigned:
    W. E. SIMONDS,
        *Commissioner of Patents.*